United States Patent
Mehta et al.

(10) Patent No.: US 7,684,337 B2
(45) Date of Patent: Mar. 23, 2010

(54) METHOD AND SYSTEM FOR COMMUNICATING IN COOPERATIVE RELAY NETWORKS

(75) Inventors: Neelesh B. Mehta, Needham, MA (US); Ritesh Madan, Stanford, CA (US); Andreas F. Molisch, Arlington, MA (US); Jinyun Zhang, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 962 days.

(21) Appl. No.: 11/333,665

(22) Filed: Jan. 17, 2006

(65) Prior Publication Data

US 2007/0165581 A1 Jul. 19, 2007

(51) Int. Cl.
*H04L 12/26* (2006.01)
*H04B 3/36* (2006.01)

(52) U.S. Cl. .............. 370/238; 370/237; 370/328; 370/310; 370/310.2; 455/7; 455/13.1; 455/11.1; 455/16; 455/506; 709/241; 709/242; 709/243

(58) Field of Classification Search ............ 370/328, 370/338, 334, 310, 310.2, 342, 238, 237, 370/249, 315
See application file for complete search history.

(56) References Cited

U.S. PATENT DOCUMENTS

| | | | |
|---|---|---|---|
| 2004/0192204 A1* | 9/2004 | Periyalwar et al. | 455/25 |
| 2004/0266339 A1* | 12/2004 | Larsson | 455/7 |
| 2007/0002765 A1* | 1/2007 | Kadaba et al. | 370/254 |
| 2007/0150928 A1* | 6/2007 | Hottinen | 725/127 |
| 2007/0177688 A1* | 8/2007 | Wu et al. | 375/267 |
| 2007/0195698 A1* | 8/2007 | Briscoe et al. | 370/235 |
| 2008/0075033 A1* | 3/2008 | Shattil | 370/328 |
| 2008/0165720 A1* | 7/2008 | Hu et al. | 370/315 |

OTHER PUBLICATIONS

A. Nosratinia, T. Hunter, and A. Hedayat, "Cooperative communication in wireless networks," IEEE Communications Magazine, vol. 42, pp. 68-73, 2004.
A. Sendonaris, E. Erkip, and B. Aazhang, "User cooperation diversity-Part I: System description," IEEE Transactions on Communications, vol. 51, pp. 1927-1938, 2003.
J. N. Laneman, D. N. C. Tse, and G. W. Wornell, "Cooperative diversity in wireless networks: Efficient protocols and outage behavior," IEEE Transactions on Information Theory, vol. 50, pp. 3062-3080, 2004.

(Continued)

*Primary Examiner*—Huy Q Phan
(74) *Attorney, Agent, or Firm*—Dirk Brinkman; Gene V. Vinokur

(57) ABSTRACT

A method and system for communicating information in a cooperative relay network of wireless nodes. The wireless nodes including a source, a set of relays, and a destination. Channel state information for each channel between a particular relay of the set of relays and the destination is estimated. A subset of the relays is selected based on the channel state information. The channel state information is fed back to the subset of relays. The source node can then broadcasting data packets from the source to the subset of relays, and the subset of relays forward coherently the data packets from the subset of relays to the destination using beamforming based on the channel state information, while adjusting power to minimize a total energy consumption in the network.

34 Claims, 12 Drawing Sheets

OTHER PUBLICATIONS

A. Wittneben, I. Hammerstroem, and M. Kuhn, "Joint cooperative diversity and scheduling in low mobility wireless networks," IEEE Global Telecommunications Conference (GLOBECOM), vol. 2, pp. 780-784, 2004.

A. E. Khandani, J. Abounadi, E. Modiano, and L. Zheng, "Cooperative routing in wireless networks," Allerton Conference on Communications, Control and Computing, 2003.

B. Rankov and A. Wittneben, "Distributed spatial multiplexing in a wireless network," The Asilomar Conference on Signals, Systems, and Computers, pp. 1932-1937, 2004.

P. Larsson, "Large-scale cooperative relay network with optimal coherent combining under aggregate relay power constraints," Future Telecommunications Conference (FTC 2003), 2003.

M. M. Abdallah and H. C. Papadopoulos, "Beamforming algorithms for decode-and-forward relaying in wireless networks," Conference on Information Sciences and Systems, 2005.

S. Cui, A. J. Goldsmith, and A. Bahai, "Energy-constrained modulation optimization," To appear in IEEE Transactions on Wireless Communications, no date found.

M. Z. Win and J. H. Winters, "Analysis of hybrid selection/maximal-ratio combing of diversity branches with unequal SNR in rayleigh fading," IEEE Vehicular Technology Conference, 1999.

A. Bletsas, A. Khisti, D. P. Reed, and A. Lippman, "A simple cooperative diversity method based on network path selection," To appear in IEEE Journal on Selected Areas in Communication, Special Issue on 4G Wireless Systems, 2006.

G. Barriac, R. Mudumbai, and U. Madhow, "Distributed Beamforming for Information Transfer in Sensor Networks," IPSN 2004, pp. 81-88.

J. Luo, R. S. Blum, L. J. Cimini, L. J. Greenstein, and A. M. Haimovich, "Link-Failure Probabilities for Practical Cooperative Relay Networks," Globecom 2005, St. Louis, MO.

Zinan Lin and Elza Erkip "Relay Search Algorithms for Coded Cooperative Systems," IEEE Globecom 2005, St. Louis, MO.

* cited by examiner

100

METHOD AND SYSTEM FOR COMMUNICATING IN COOPERATIVE RELAY NETWORKS

FIELD OF THE INVENTION

This invention relates generally to wireless communications networks, and more particularly to communicating in a cooperative relay network with fading channels.

BACKGROUND OF THE INVENTION

In conventional relay networks, data packets are transmitted from a source node to a destination node via a single path with, perhaps, multiple serial hops through relay nodes.

In a cooperative relay network, wireless nodes cooperate with each other in transmitting data packets in parallel. By exploiting the broadcast nature of a wireless channel to reach multiple relay nodes simultaneously, and by enabling the relay nodes to cooperate, it is possible to reduce energy consumption in delivering a packet from the source to the destination. This can also significantly increase gains in overall throughput and energy efficiency, A. Nosratinia, T. Hunter, and A. Hedayat, "Cooperative communication in wireless networks," IEEE Communications Magazine, vol. 42, pp. 68-73, 2004; A. Sendonaris, E. Erkip, and B. Aazhang, "User cooperation diversity-Part I: System description," IEEE Transactions on Communications, vol. 51, pp. 1927-1938, 2003; and J. N. Laneman, D. N. C. Tse, and G. W. Wornell, "Cooperative diversity in wireless networks: Efficient protocols and outage behavior," IEEE Transactions on Information Theory, vol. 50, pp. 3062-3080, 2004.

In cooperative relay networks, where the nodes are powered by batteries, minimizing energy consumption is important. At the same time, it is required that outage, which occurs due to deep channel fading, is kept below a specified level.

Typically, the source node transmits data packets to the destination node in parallel using several intermediate relay nodes, A. Wittneben, I. Hammerstroem, and M. Kuhn, "Joint cooperative diversity and scheduling in low mobility wireless networks," IEEE Global Telecommunications Conference (Globecom), vol. 2, pp. 780-784, 2004; A. E. Khandani, J. Abounadi, E. Modiano, and L. Zheng, "Cooperative routing in wireless networks," Allerton Conference on Communications, Control and Computing, 2003; and B. Rankov and A. Wittneben, "Distributed spatial multiplexing in a wireless network," The Asilomar Conference on Signals, Systems, and Computers, pp. 1932-1937, 2004.

Cooperative beamforming has also been referred to as distributed beamforming, see G. Barriac, R. Mudumbai, and U. Madhow, "Distributed Beamforming for Information Transfer in Sensor Networks," IPSN 2004, pp. 81-88, 2004. Mechanisms for enabling synchronization between relays using a trigger pulse mechanism from a master relay node were described. The effect of coordination error was analyzed. However, they do not take any relay selection or outage into account. The overall energy consumption from the source to destination is also not considered.

Four simple relay selection criteria are described by J. Luo, R. S. Blum, L. J. Cimini, L. J. Greenstein, and A. M. Haimovich, "Link-Failure Probabilities for Practical Cooperative Relay Networks," IEEE Globecom, 2005. Two of the criteria, 'Pre-Select One Relay' and 'Best-Select Relay,' select a single best relay based on a mean channel gains, while in the remaining two criteria, 'Simple Relay' and 'ST-Coded Relay,' all of the relays that decode data from the source are selected. In 'Simple Relay,' the relay nodes do not synchronize their phase, while in 'ST-Coded Relay,' a distributed space-time code is used. Hybrids of the above schemes were also described.

Search algorithms for selecting a single relay node based on an average distance or path loss between the nodes, frame error probability and pairwise codeword error probability were described by Z. Lin and E. Erkip, "Relay Search Algorithms for Coded Cooperative Systems," IEEE Globecom, 2005.

Khandani et al. describe a model that is restricted to additive white Gaussian noise channels with phase compensation. That model does not consider dynamic fading-induced channel variations, outage, or the overhead required for cooperation between relay nodes.

Knowledge of the channel state information (CSI) at a transmitter is assumed by Laneman et al. above. However, they do not consider the cost of acquiring the CSI. Wittneben et al. only considers amplify-and-forward, which also neglects the cost of acquiring the CSI, see also M. M. Abdallah and H. C. Papadopoulos, "Beamforming algorithms for decode-and-forward relaying in wireless networks," Conference on Information Sciences and Systems, 2005.

Because the cost of acquiring the CSI can be a significant factor in cooperative relay networks, it is desired to consider the CSI cost so that relay selection can be optimized, and total power consumption in the network can be minimized. A simple relay selection rule that selects only one relay according to a metric that is based on both the source-to-relay and relay-to-destination links was described by A. Bletsas, A. Khisti, D. P. Reed, and A. Lippman, "A simple cooperative diversity method based on network path selection," To appear in IEEE Journal on Selected Areas in Communication, Special Issue on 4G Wireless Systems, 2006.

SUMMARY OF THE INVENTION

The embodiments of the invention provide a method for selecting a subset of relay nodes and for satisfying an outage constraint in a cooperative relay network. The selected relay nodes cooperate to relay data packets from a source node to a destination node in parallel.

The invention also describes a protocol to enable cooperative communication that includes the stages of acquiring CSI at relay nodes through feedback and training.

The source node broadcasts data packets to the relay nodes. The relay nodes decode the received data. Some or all of these relays, based on a relay selection and outage rule, then linearly weight their transmit signals as the data packets are forwarded to the destination node. In this way, the transmit signals add up constructively at the destination node. This process can be characterized as cooperative beamforming by the selected relay nodes.

An embodiment of the invention describes simplified relay selection and outage criteria that depend only on the set of relays that have decoded the data, and not on the instantaneous link conditions of the relays. This is a generalization of the best relay selection rule.

The embodiments of the invention explicitly model an overhead power consumption for acquiring the channel state information (CSI) for beamforming.

In a general case, the channel power gain over each link is independent with a different mean. For the general case, models are constructed for the total power consumption. These models are then used to optimize a relay cooperation rule for selecting relays that minimizes the total power consumption.

The model can be simplified when channels between nodes have independent and identical channel power gains. In this case, the optimal transmission scheme has a simple structure.

The model can make trade offs between the number of available nodes, the number of actively relaying nodes, outage probability, and total energy consumed.

As an advantage, the model enables the selection of a minimal number of cooperating relay nodes, at any one time, that minimize total power consumption in the network.

DETAILED DESCRIPTION OF THE PREFERRED EMBODIMENT

Cooperative Relay Network

Figure 1A:
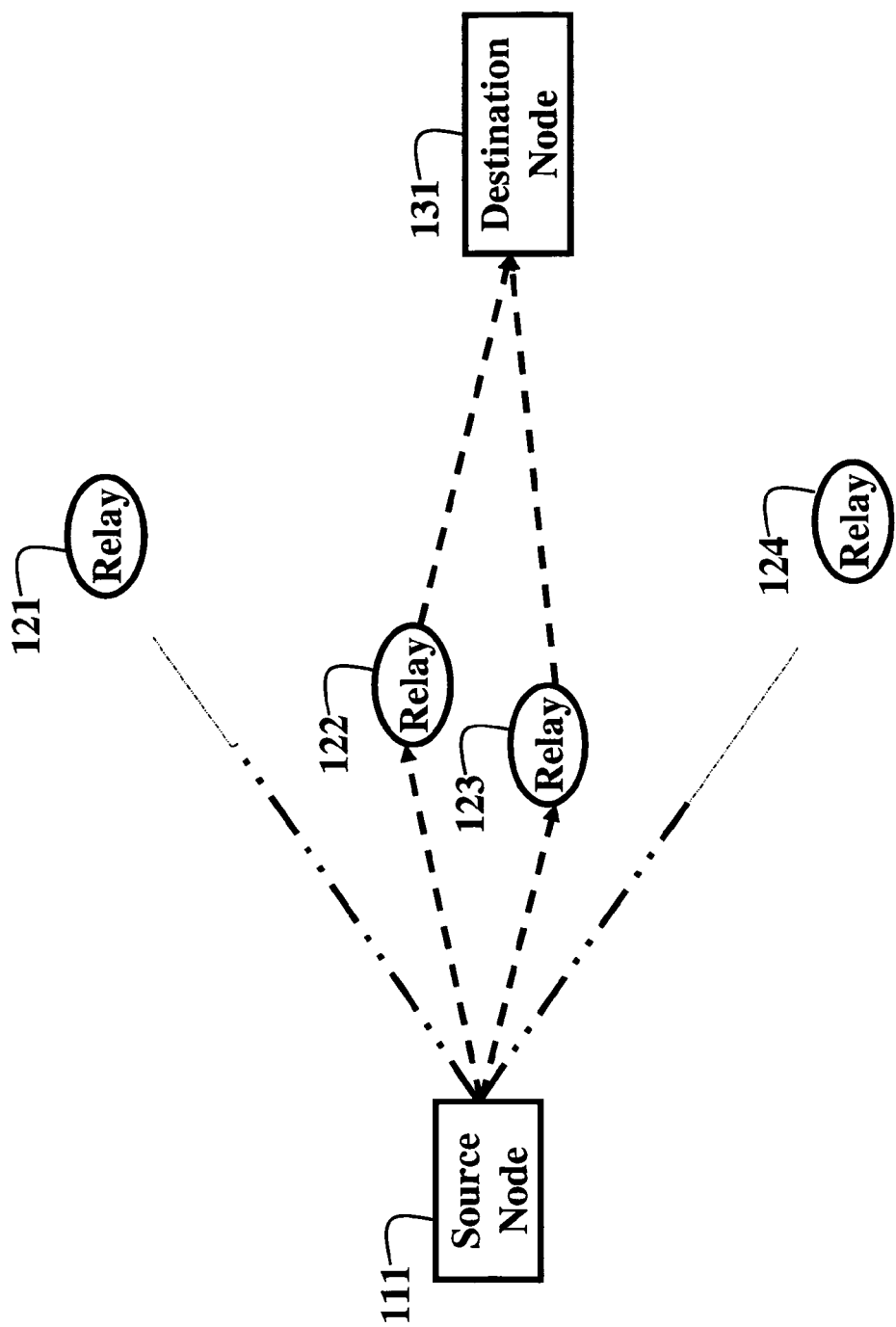
FIGS. 1A and 1B are diagrams of cooperative relay networks according to an embodiment of the invention.
Figure 1B:
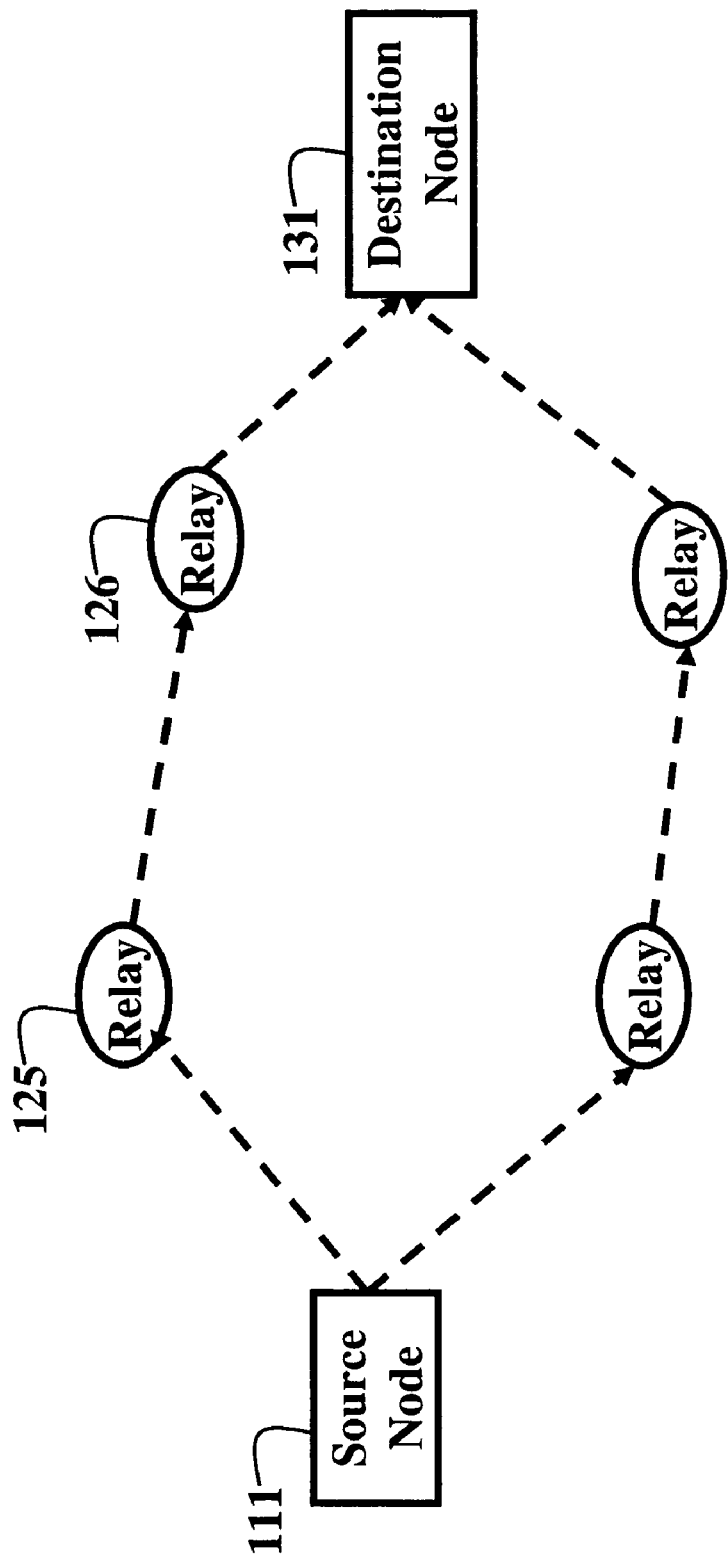

FIGS. 1A and 1B show communications networks 100 according to an embodiment of our invention. It is desired to minimize power consumption in the network while sending data packets. The method includes training 10 and operational 20 phases, see FIG. 2. In one embodiment of the invention the phases 10 and 20 are combined.

The cooperative relay network 100 includes a source node 111, a set of N relay nodes 121-126, and a destination node 131, i.e., source, relays, and destination, respectively. All channels between all nodes are frequency non-selective channels that undergo independent Rayleigh fading.

Therefore, the channel power gains $h_i$ from the source to the set of relays, and the channel power gains $g_i$ from the set of relays to the destination are modeled as independent, exponentially distributed random variables with means $\bar{h}_i$ and $\bar{g}_i$, respectively, where $i=1, \ldots, N$. The mean channel power gains depend on a distance between the corresponding nodes and shadowing. In general, the means are different.

In one embodiment of the invention, we assume that all channels are reciprocal. This condition is fulfilled in time division duplexing systems when the round-trip duplex time is shorter than a coherence time of the channel. In frequency division duplexing systems, the reciprocal condition is met when the frequency duplex separation is smaller than a coherence bandwidth.

At all nodes, additive white Gaussian noise with power spectral density $N_0$ is present. All the transmissions in the system have a bandwidth of B Hz and occur with a fixed data rate of r bits/symbol. Fixing data rate r simplifies the design of the relays. If the data rate is fixed, then the relays do not need to remodulate transmissions using a different signal constellation.

In the example shown in FIG. 1A, only the relay nodes 122-123 can decode the received signal. We assume that a relay can decode data only when the signal to noise ratio (SNR) of the received signal exceeds a predetermined threshold T, which is a function of the bit rate r.

For purposes of this description, we use the Shannon capacity formulation to determine the relationship between the SNR threshold and the data rate r. In particular, we select the threshold as $T=N_0B(2^r-1)$. Similar threshold formulations exist for MFSK and MQAM signaling. The threshold can also take into account the impact of error correction codes.

Relay Selection

Figure 2:
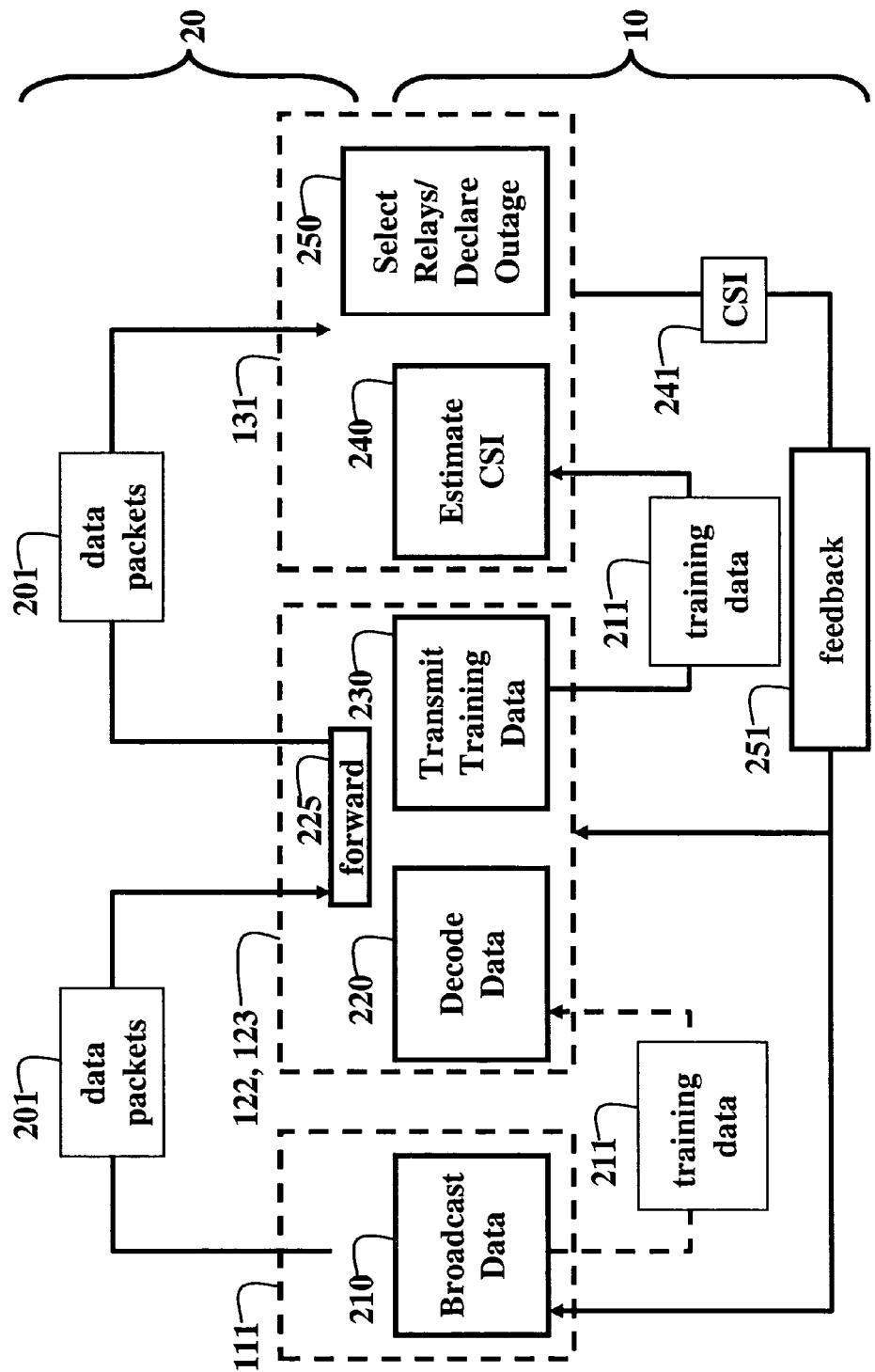
FIG. 2 is a flow diagram of relay selection and outage declaration according to an embodiment of the invention.

FIG. 2 shows the steps of a method 200 for selecting relays that participate in forwarding data packets from the source 111 to the destination 131 via the relays 121-126 according to one embodiment of the invention.

The method may perform training 10 before forwarding 225 data packets 201. It should be understood, that the training can also be performed on the data packets. In this case, the source 111 broadcasts 210 training data 211. The relays 122-123 that receive the training data with a sufficiently high SNR decode 220 the training data. Alternatively, the training is performed on data packets. In this case, the source 111 broadcasts 210 the data 211 as data packets. The relays 122-123 that receive the data 211 with a sufficiently high SNR decode 220 the data.

The particular relays that decode successfully the data 211 transmit 230 the data 211 to the destination 131.

The destination 131 estimates 240 the channel state information (CSI) 241 for each channel between the destination and each particular relay that decoded the data 211 during training. Based on the CSI, the destination selects 250 a subset of relays that are to participate in further forwarding 225 of the data packets 201. The selected relays can be some or all of the relays that received the training data. The destination feeds back the CSI 241 to those nodes. Other information can also be included as part of the feedback 251.

Subsequently, the source 111 broadcasts the data packets 201, and only the selected subset of relays forward 225 the data packets 201 as weighted transmit signals to the destination 131.

It should be understood that the relays can also estimate the CSI based on feedback data received from the destination, as described below.

In another embodiment of the invention, the source broadcasts data packets and relays that can decode the data packets temporarily store the data packets. The relays that successfully decode the data packets transmit training data to the destination. The destination estimates the channel, selects, and feeds back the channel information to the selected relays.

The selected relays adjust their power gain accordingly, and forward the stored data packets and any subsequently received data packets to the destination.

It should also be understood, that the embodiments of the invention can also by used with multiple relay 'hops' as shown in FIG. 1B. In this case, relay 125 also acts as a 'source' for a 'destination' relay 126 during training 10. This scheme can be extended to additional hops.

In all cases, it should be understood, that our method is dynamic. For example, the training, estimating, selecting and power adjustment can occur multiple times per second, e.g., every 200 milliseconds or five times per second. If the channel varies slowly, then the power only needs to be adjusted every couple of seconds. Also, in all cases, the power adjustment minimizes a total energy consumption in a cooperative relay network according to the embodiments of the invention.

Source Broadcast

The source 111 broadcasts the data 201 (and, optionally, training data 211) using a transmission power $P_S$ and a data rate r for $T_d$ symbol durations. The received power at the relays i is $h_i P_S$, where $h_i$ is the channel power gain. A relay can decode the data correctly only when the SNR of the received signal exceeds the threshold $T=N_0 B(2^r-1)$ described above.

Thus, depending on the channel states, only relays, $M \subseteq \{1, \ldots, N\}$ of the N relays successfully receives the data from the source.

Training

Only the M relays that receive the training data 211 successfully from the source 111 transmit training data 211 at the rate r and a power $P_t$ to the destination 131. This enables the destination to estimate the instantaneous channel power gains, $\{g_i, i \in M\}$, from the relays to the destination.

We assume that the power $P_t$ is sufficient to accurately estimate the channel power gains. Also, we assume that the time for the training is $T_t = M$ symbol durations, which is a minimum possible training duration.

Feedback of CSI

Based on the channel power gains, $\{g_i, i \in M\}$, in step 250, the destination either declares an outage with probability $p_{out}(M)$, or the destination selects a subset of the M relays, including K(M) relays with the best channel power gains to the destination, and feeds back 251 to the selected relays the required CSI. The CSI requirements are discussed below.

In one embodiment of the invention, we assume that the number of relays K(M) selected for data packet transmission, when outage is not declared, is only based on M and not on the instantaneous channel states $\{g_i, i \in M\}$.

Note that the set of relays M, along with their mean channel power gains $\{\bar{g}_i, i \in M\}$, is a measure of a diversity in the network 100.

This technique may be suboptimal for specific network arrangements. However, this technique is justified by the fact that it greatly reduces the complexity of the selection rule that is implemented in the destination node. Furthermore, the technique makes the problem analytically tractable. However, the actual subset of relays (of size K(M)) used at each step depends on the instantaneous channel power gains. Also, outage is declared by the destination with a probability $p_{out}(M)$, which is a function of M and is independent of the channel power gains.

It is sufficient for the destination to feedback 251 the sum of channel power gains $$\sum_{i=1}^{K(M)} g_i$$

to all of the selected subset K(M) of relays, and the channel gain $g_i$ and the channel phase to only the corresponding selected relays i. The feedback 251, at a rate of r, takes $T_f$ symbol durations. If c symbols are needed to feedback each channel gain and phase, then $T_f(K(M)) = c(1+K(M))$.

We reorder the channel power gains of the M relays that decode the training data from the source successfully in a descending order, $g_{[1]} > \ldots > g_{[M]}$. Using the SNR threshold formula based on Shannon capacity, the minimum feedback power to reach relay i for a reciprocal system is $N_0 B(2^r-1)/g_{[i]}$, and the minimum feedback power to broadcast the sum of channel gains to all the K(M) relays is determined as the node [K(M)] with the worst channel, and is $N_0 B(2^r-1)/g[K(M)]$.

Variation of the Outage and Relay Selection

The destination can declare outage when the sum of the relay gains falls below a threshold. Similarly, an alternate relay selection rule selects enough relays so that a sum of relay gains exceeds the threshold.

Beamforming

Given the knowledge of the CSI, an optimal transmission power at each selected relay i is $$\left( g_i \bigg/ \left( \sum_{i=1}^{K(M)} g_i \right)^2 \right) N_0 B(2^r - 1).$$

The K(M) relay nodes cooperate, i.e., transmit coherently, to forward 225 data packets 201 at data rate r to the destination 131 for $T_D$ symbol times during the operational phase 20. This is similar to beamforming or maximum ratio combining transmission in transmit diversity systems. The data packets are now guaranteed to reach the destination.

The case when M=1, i.e., only one relay decodes the training data, is described in greater detail because the minimum power at which the relay needs to transmit to reach the destination is proportional to the inverse of the channel power gain. As is well known, an infinite average power is necessary for channel inversion with zero outage over a Rayleigh fading channel.

Therefore, for the special case when M=1, we assume that the relay is allowed to transmit only when its channel power gain exceeds a threshold. In other words, the relay does not transmit with a probability of $\delta$. We assume that the probability $\delta$ is a fixed parameter.

To summarize, when $M \geq 2$, the relays cannot transmit if the destination declares an outage, while for M=1, the relay cannot transmit when the destination declares an outage or when the gain is below a threshold.

When the destination does allow the single relay to transmit, the destination has to feedback to this relay only the CSI for the channel from the selected relay to the destination, which takes c, not 2c, symbol durations.

To ensure that the CSI does not change during data packet transmission, a longest possible period for training, feedback of the CSI, and data transmission from the relays to the destination, $N+cN+T_d$ is less than the coherence time of the channel.

Variations of the Method

Instead of feeding back the CSI or a quantized version of the CSI to each relay, the destination can feedback training data to the relays. In this embodiment, the relays estimate their respective power gains, because the channels are assumed to be reciprocal. The destination also feeds back the sum of channel gains to all relays. Then, the relays adjust their transmission power accordingly and cooperatively beamform to forward data packets to the destination while minimizing the total power consumption in the network.

In another embodiment, the destination feeds back 251 a threshold for the channel gain that a relay has to exceed in order to forward data packets. The destination also feeds back the total channel power gain to the relays. Due to the reciprocity, each relay can estimate its own channel power gain by analyzing the feedback 251. The feedback can also be accompanied by a training sequence to help the relays in estimating the channel, as described above.

Analysis

We denote by $p(M, P_S)$, the probability that a set M of relays successfully decode the data 211 broadcast by the source for training, when the source broadcast power is $P_S$. First, we consider the case when $M \geq 2$. For a given relay selection rule K, let $P_f(K(M), M)$ denote the average power consumed in feeding back the CSI to the selected relays, and $P_d(K(M), M)$ denote the average power consumed by the relays to coherently transmit data packets 201, conditioned on the set of relays, M, and on the event that the destination does not declare outage.

For the case M=1, these quantities also take into account the possibility that the single relay is not allowed to transmit because the gain from the relay to the destination is below a threshold.

We analyze the average total energy required to transmit a data packet from the source to the destination as a function of the broadcast power $P_S$ and the relay selection rule K. The goal is to determine an optimal source broadcast power, $P_S$, outage probabilities, $p_{out}(M)$, and the relay selection rule, $K(M)$, for $M \subseteq \{1, \ldots, N\}$, that minimize the total average energy consumption per data packet subject to an outage constraint.

The destination does not receive data when no relays receive data, with probability $p(\emptyset, P_S)$. When only one relay, i, receives data, that relay is not allowed to transmit, with a probability $p_{out}(\{i\})p(\{i\}, P_S) + \delta \, p(\{i\}, P_S)(1-p_{out}(\{i\}))$. If exactly the set M, with $M \geq 2$, of relays receive data, then outage is declared by the destination with probability $p(M, P_S)p_{out}(M)$.

Note that when one relay, i, receives training data, outage can be declared if at least one of the following two independent events occurs: the channel power gain from that one relay to the destination is less than the threshold, or the destination declares outage with probability $p_{out}(\{i\})$, independent of the channel power gain.

Therefore, the constraint that the total outage probability does not exceed $P_{out}$ can be expressed as $$P_{out} \geq p(\phi, P_S) + \sum_{i=1}^{N} \delta p(\{i\}, P_S)(1 - p_{out}(\{i\})) + \tag{1}$$

$$\sum_{M \subseteq \{1, \ldots, N\}} p(M, P_S) p_{out}(M).$$

The energy consumed in broadcasting data from the source to the relays is $T_d P_S$. The M relays, which receive the data, transmit training data to the destination. This consumes energy $MP_t$. If the destination does not declare outage, then the destination feedbacks CSI to the relays. This consumes an average energy of $T_f(K(M))P_f(K(M), M)$.

The relays beamform to transmit the data packets to the destination, which consumes an average energy of $T_d P_d(K(M), M)$. The total average energy consumption, $E(p_{out}, K, P_S)$, is given by $E(p_{out}, K, P_S)$ $$= T_d P_S + \sum_{M \subseteq \{1, \ldots, N\}} p(M, P_S) \tag{2}$$

$$\left( MP_t + (1 - p_{out}(M)) \left( \begin{array}{c} T_f(K(M))P_f(K(M), M) + \\ T_d P_d(K(M), M) \end{array} \right) \right).$$

Computation of $p(M, P_S)$

We reorder the relay gains $h_1, \ldots, h_N$ in descending order $h_{[1]} > \ldots > h_{[N]}$. Thus, the reordering permutation is a random variable and depends on the instantaneous values of the power gains $h_1, \ldots, h_N$. Relay i receives training data if and only if $$h_i \geq (N_0 B(2^r - 1)/P_S \triangleq \gamma,$$

where $\lambda$ is a predetermined threshold.

Then, we have the following relations $$p(M, P_S) = Pr(\{h_i \geq \gamma : i \in M\} \cap \{h_i < \gamma : i \notin M\}) \tag{3}$$

$$= Pr\left( \begin{array}{c} \{M \text{ nodes recieve data}\} \cap \\ \{[1], \ldots, [M] \text{ belong to set } M\} \end{array} \right).$$

Feedback and Data Power Consumption

M>1 case: The channel power gain statistics $g_i$ are independent of M because all of the channel power gains are independent of each other. The channel power gains from the relays to the destination are arranged in a descending order $g_{[1]} > \ldots > g_{[M]}$, where $[1], \ldots, [M]$ denote the corresponding indices.

The destination broadcasts the sum of the channel gains to all the selected K(M) relays, and the individual channel power gains and phases only to the corresponding selected relays.

The subset of K(M) best relays with indices $[1], \ldots, [K(M)]$ are selected. Hence, the average power consumption for feedback of CSI is $$P_f(K(M), M) = (2^r - 1) \frac{N_0 B}{K(M) + 1} \mathbb{E}\left[ \frac{1}{g_{[K(M)]}} + \sum_{i=1}^{K(M)} \frac{1}{g_{[i]}} \right]. \tag{4}$$

The total average power consumed by the relays to beamform data to the destination is $$P_d(K(M), M) = N_0 B(2^r - 1) E(1/g_{sum}), \tag{5}$$

$$\text{where } g_{sum} = \sum_{i=1}^{K(M)} g_i.$$

where $g_{sum} = \sum_{i=1}^{K(M)} g_i$.

M=1 case: Let i denote the single relay that receives the data from the source. The M=1 case is different because the relay does not transmit when the instantaneous power gain, $g_i$, is too low. When outage is not declared, the node inverts the channel to transmit data to the destination at rate r. The average power consumed to feedback the CSI is $$P_f(\{i\}, \{i\}) = \tag{6}$$

$$N_0 B(2^r - 1) \int_\alpha^\infty \frac{1}{\bar{g}_i x} e^{-\frac{x}{\bar{g}_i}} dx = -\frac{N_0 B(2^r - 1)}{\bar{g}_i} Ei\left(\frac{-\alpha_i}{\bar{g}_i}\right),$$

where $\alpha_i = -g_i \log_e(1-\delta)$ and Ei is a conventional exponential integral function.

Virtual Branch Analysis

We use a virtual branch analysis techniques to derive expressions for $p(M, P_S)$, $P_f(K(M), M)$, and $P_d(K(M), M)$, see M. Z. Win and J. H. Winters, "Analysis of hybrid selection/maximal-ratio combining of diversity branches with unequal SNR in Rayleigh fading," IEEE Vehicular Technology Conference, 1999, incorporated herein by reference.

We introduce additional notations. For $n=1, \ldots, N$, define functions $\Phi_n: \Re^{n+1} \mapsto \Re$, and
$\epsilon_n: \Re^n \mapsto \Re$ as follows.

Consider independent exponential random variables $Y_1, \ldots, Y_n$ with means $y_1, \ldots, y_n$. We denote the probability distribution function of $X=Y_1 + \ldots Y_n$ as $f_X(x) = \Phi_n(y_1, \ldots, y_n, x)$. Because the random variables $Y_i$ are independent exponential random variables, the Laplace transform, (Lf), of $f_X(x)$ is given by $$(Lf)(s) = \prod_{i=1}^{n} \frac{1}{s+y_i}.$$

Hence, we can evaluate $\Phi_n(y_1, \ldots, y_n, x)$ using a partial fraction expansion. In particular, if $$\{y_1, \ldots, y_n\} = \left\{ \underbrace{a_1, \ldots, a_1}_{n_1}, \underbrace{a_2, \ldots, a_2}_{n_2}, \ldots, \underbrace{a_m, \ldots, a_m}_{n_m} \right\},$$

where $n_1 + \ldots + n_m = n$, then $$\Phi_n(a_1, \ldots, a_1, \ldots, a_m, \ldots, a_m) = \sum_{i=1}^{n_1} \frac{c_{1i} x^{i-1} e^{-a_1 t}}{(i-1)!} + \ldots + \sum_{i=1}^{n_m} \frac{c_{mi} x^{i-1} e^{-a_m t}}{(i-1)!} \quad (7)$$

where the constants $c_{ji}$ are given by $$c_{ji} = \frac{1}{(n_j - i)!} \frac{d^{n_j - i}}{ds^{n_j - i}} (s - a_j)^{n_j} \prod_{i=1}^{n} \frac{1}{s+y_i} \bigg|_{s=-a_j}.$$

The mean of $1/X$ is denoted by $\epsilon_n(y_1, \ldots, y_n)$, and is given by $$\mathbb{E}\frac{1}{X} = \varepsilon_n(y_1, \ldots, y_n) = \int_{x=0}^{\infty} \frac{1}{x} \Phi_n(y_1, \ldots, y_n, x) dx. \quad (8)$$

Let $S(n)$ denote the set of permutations of the set $\{1, \ldots, n\}$. Define the following events.

$A_\sigma = (h_{[1]} = h_{\sigma(1)}, \ldots, h_{[N]} = h_{\sigma(N)})$, $\sigma \in S(N)$ and $B_\sigma = (g_{[1]} = g_{\sigma(1)}, \ldots, g_{[M]} = g_{\sigma(M)})$, $\sigma \in S(M)$.

Then, for Rayleigh fading $$Pr(A_\sigma) = \prod_{i=1}^{N} \frac{1}{\bar{h}_{\sigma_i}} \left[ \sum_{m=1}^{i} \frac{1}{\bar{h}_{\sigma_m}} \right]^{-1}, \sigma \in S(N),$$

$$Pr(B_\sigma) = \prod_{i=1}^{M} \frac{1}{\bar{g}_{\sigma_i}} \left[ \sum_{m=1}^{i} \frac{1}{\bar{g}_{\sigma_m}} \right]^{-1}, \sigma \in S(M).$$

We make use of the following change of variables:

$$h_{[i]} = \sum_{n=i}^{N} W_n, \, i = 1, \ldots, N, \quad (9)$$

$$g_{[i]} = \sum_{n=i}^{M} V_n, \, i = 1, \ldots, M.$$

Conditioned on the event $B_\sigma$, the random variables $W_1, \ldots, W_N$ are independent, and their joint probability density function is given by $$f_W(w_1, \ldots w_N) = \sum_{\sigma \in S(N)} Pr(A_\sigma) f_{W|A_\sigma}(w_1, \ldots w_N) = \sum_{\sigma \in S(N)} Pr(A_\sigma) \prod_{i=1}^{N} f_{W_i|A_\sigma}(w_i). \quad (10)$$

where $$f_{W_i|A_\sigma}(x) = \begin{cases} \frac{1}{\hat{h}_i(\sigma)} e^{-\frac{x}{\hat{h}_i(\sigma)}} & x \geq 0 \\ 0 & \text{otherwise} \end{cases}, i = 1, \ldots, N, \quad (11)$$

and $$\hat{h}_i(\sigma) = \left[ \sum_{m=1}^{i} \frac{1}{\bar{h}_{\sigma(m)}} \right]^{-1}.$$

Using Equations (9) and (11), $$f_{h_{[i]}|A_\sigma}(x) = \Phi_{1+N-i}(\hat{h}_i(\sigma), \ldots, \hat{h}_N(\sigma), x).$$

An identical analysis can be done for $g[i]$ and $V_i$.

From Equation (3), $$p(M, P_S) \stackrel{(a)}{=} Pr\left( \begin{array}{c} \{h_{[M]} \geq \gamma_r, h_{[M+1]} < \gamma_r\} \cap \\ \{A_\sigma: \sigma \in S(N), \{\sigma(1), \ldots, \sigma(M)\} = \mathcal{M}\} \end{array} \right)$$

$$\stackrel{(b)}{=} \sum_{\sigma: \{\sigma(1), \ldots, \sigma(M)\} = \mathcal{M}} Pr(A_\sigma) Pr\left( \begin{array}{c} \{h_{[M+1]} < \gamma_r | A_\sigma\} \cap \\ \{h_{[M+1]} + W_M > \gamma_r | A_\sigma\} \end{array} \right),$$

$$\stackrel{(c)}{=} \sum_{\sigma: \{\sigma(1), \ldots, \sigma(M)\} = \mathcal{M}} Pr(A_\sigma) \int_0^{\gamma_r} \int_{\gamma_r - g}^{\infty} f_{h_{[M+1]}|A_\sigma}(y) f_{W_M|A_\sigma}(x) dx dy.$$

Step (a) holds because the first set corresponds to the event that M relays decode the data successfully, while the second set corresponds to the event that the relays in the set M are the relays with the best channel gains from the source to the relays.

Because the events $A_\sigma$ are disjoint, Step (b) follows from the law of total probability.

Step (c) follows because, conditioned on the events $A_\sigma$, the random variables $h_{[M+1]}$ and $W_M$ are independent, see M. Z. Win and J. H. Winters, "Analysis of hybrid selection/maximal-ratio combining of diversity branches with unequal SNR in Rayleigh fading," IEEE Vehicular Technology Conference, 1999, incorporated herein by reference.

To determine the average feedback power $P_f(K(M), M)$ in Equation (4), we can compute $$\mathbb{E}\frac{1}{g_{[i]}} = \sum_{\sigma \in S(M)} Pr(B_\sigma) \mathbb{E}\left(\frac{1}{g_{[i]}} \Big| B_\sigma\right) \qquad (12)$$
$$= \sum_{\sigma \in S(M)} Pr(B_\sigma) \mathbb{E}\left(\frac{1}{(V_i + \ldots + V_M)} \Big| B_\sigma\right)$$
$$= \sum_{\sigma \in S(M)} Pr(B_\sigma) \varepsilon_{1+M-i}(g_i(\sigma), \ldots, g_M(\sigma)).$$

For computing the data power in Equation (5), we need to evaluate $$\mathbb{E}\left(\frac{1}{g_{sum}}\right).$$

By exploiting the independence of the $V_i$s, conditioned on B, we can show that $$\mathbb{E}\frac{1}{g_{sum}} \sum_{\sigma \in S(M)} Pr(B_\sigma) \varepsilon_M \left(\begin{array}{c} \hat{g}_1(\sigma), 2\hat{g}_2(\sigma), \ldots, \\ K(M)\hat{g}_{K(M)}(\sigma), \ldots, K(M)\hat{g}_M(\sigma) \end{array}\right).$$

Optimal Transmission Strategy

Let $p^*_{out}$, $K^*$, and $P^*_S$ denote the parameters corresponding to an optimal transmission strategy. Note that for $M' \neq M$, the choice of $K(M')$ does not affect $P_f(K(M), M)$ and $P_d(K(M), M)$. Hence, from the separable structure of the total average energy consumption per packet in Equation (2), it can be seen that we can compute the optimal relay selection rule $K^*(M)$ for each set M separately. Thus, $$K^*(M) = \underset{1 \leq K(M) \leq M}{\text{argmin}} [T_f(K(M)) P_f(K(M), M) + T_d P_f(K(M), M)]. \qquad (13)$$

The following lemma about $p^*_{out}$ of the optimal transmission scheme follows.

Lemma 1: Let us label the sets M, $M_1, \ldots, M_{2^N}$ such that for all $i \leq j$, $$T_f(K^*(M_i)) P_f(K^*(M_i), M_i) + T_d P_d(K^*(M_i), M_i) \geq$$
$$T_f(K^*(M_j)) P_f(K^*(M_j), M_j) + T_d P_d(K^*(M_j), M_j),$$

i.e., we order the sets $M_i$ of relay nodes in a decreasing order of average feedback and data energy consumption conditioned on the events that M is the set of relay nodes that successfully decode the data from the source, and the destination does not declare outage. The optimal outage strategy has the following structure. For some $0 < n^* < 2^N$, $$p_{out}^*(M_n) = 1, n < n^*, 0 \leq p_{out}^*(M_{n^*}) \leq 1, p_{out}^*(M_n) = 0, n > n^*. \qquad (14)$$

Moreover, $p_{out}^*(M_{n^*}) p(M_{n^*}, P_S) + \sum_{n=1}^{n^*-1} p(M_n, P_S) = P_{out}$.

Proof: The proof is given in Appendix A.

From the above Lemma 1, it follows that we can order the states in increasing order of energy consumption and set $p_{out}(M) = 1$ for as many states as possible, starting from the first state. Also, the constraint that the maximum outage probability should be less or equal to $P_{out}$ is satisfied with equality at optimality.

Homogeneous Rayleigh Fading Channels

We now consider the case when all channels have the same mean channel power gain, i.e., $$\bar{h}_i = \bar{h}, \bar{g}_i = \bar{g}, i = 1, \ldots, N.$$

For this special case, the analysis simplifies to a simple method for determining the optimal transmission strategy. Also, the tradeoffs become much clearer. This helps us acquire good intuition for a design of system.

By symmetry, we have the following simplifications.

$$p(M, P_S) = p(M, P_S),$$

$$P_f(K(M), M) = P_f(K(M), M), \text{ and}$$

$$P_d(K(M), M) = P_d(K(M), M),$$

where, as before, $M = |M|$.

Also, for an optimal transmission scheme $K^*(M)$ depends only on M. In addition, we have Lemma 2.

Lemma 2: There exists an optimal transmission strategy for which $p_{out}(M)$ is the same for all sets M of the same cardinality.

Proof: The proof follows using symmetry arguments and Equations (1) and (2).

Without loss of generality, we restrict ourselves to relay selection rules K(M) and outage rules $p_{out}(M)$ that depend only on M.

The destination does not receive data when no relays receive data with probability $p(0, P_S)$, or when only one relay receives data but cannot transmit, with probability $p_{out}(1) p(1, P_S) + \delta p(1, P_S)(1 - p_{out}(1))$, or if more than one relays receive data and outage is declared by the destination with probability $p(M, P_S) p_{out}(M)$. Therefore, the constraint that the total outage probability does not exceed $P_{out}$ can be written as $$P_{out} \geq p(0, P_S) + \sum_{M=1}^{N} p(M, P_S) p_{out}(M) + \delta p(1, P_S)(1 - p_{out}(1)). \qquad (15)$$

The energy consumed in broadcasting data from the source to the relays is $T_d P_S$. The M relays that receive the data transmit training data to the destination. This consumes energy $MP_t$. If the destination does not declare outage, then the destination feedbacks CSI to the relays. This consumes an average energy of $T_f(K(M)) P_f(K(M), M)$. The relays beamform to transmit the data packet to the destination, which consumes an average energy of $T_d P_d(K(M), M)$.

Thus, the total average energy consumption, $E(p_{out}, K, PS)$, is given by $$T_d P_S + \sum_{m=1}^{N} p(M, P_S) MP_t + \sum_{M=1}^{N} p(M, P_S)(1 - p_{out}(M)) \qquad (16)$$
$$(T_f(K(M)) P_f(K(M), M) + T_d P_d(K(M), M)).$$

Computing $p(M, P_S)$

Relay i receives data if and only if the channel power gain from the source to the relays is $h_i \geq (N_0 B(2^r - 1)/P_S \triangleq \lambda$. Again, consider the random permutation $[1], \ldots, [N]$ of the relay indices such that the relay channel power gains are sorted in a descending order $h_{[1]} > \ldots > h_{[N]}$. Then, the probability that exactly M relay nodes successfully decode the data transmitted by the source is $$p(M, P_S) = Pr(h_{[i]} \geq \lambda, h_{[i+1]} < \gamma).$$

Feedback and Data Power Consumption

M>1 case: Again, the channel statistics $g_i$ are independent of M because all of the channel power gains are independent of each other. We relabel the relay nodes such that relay nodes $1, \ldots, M$ successfully decode the data broadcast by the source. The downlink channel power gains from the relays to the destination are arranged in an descending order $g_{[1]} > \ldots > g_{[M]}$.

The destination broadcasts the sum of the channel power gains to all of the K(M) relays, and the individual channel power gains and phases to the corresponding relays. The K(M) best relays with indices $[1], \ldots, [K(M)]$ are selected. Hence, the average power consumption for feedback of CSI is given by $$P_f(K(M), M) = \frac{N_0 B(2^r - 1)}{K(M) + 1} \mathbb{E}\left[\frac{1}{g_{[K(M)]}} + \sum_{i=1}^{K(M)} \frac{1}{g_{[i]}}\right]. \quad (17)$$

The average total power consumed by the relays to beamform data to the destination is $$P_d(K(M), M) = N_0 B(2^r - 1) \mathbb{E} \frac{1}{g_{sum}}, , \quad (18)$$

where $g_{sum}$ is as defined above.

M=1 case: The analysis for this case is identical to that for the non-homogeneous case. We have $$P_f(K(1), 1) = P_d(K(1), 1) = -\frac{N_0 B(2^r - 1)}{\bar{g}} Ei\left(\frac{-\alpha}{\bar{g}}\right),$$

where $\alpha = -\bar{g}\log_e(1 - \delta)$.

Virtual Branch Analysis

The virtual branch analysis now is simplified greatly compared to the general case. Specifically, we can use the following transformation $$h_{[i]} = \sum_{n=i}^{N} W_n, i = 1, \ldots, N,$$

and $g_{[i]} = \sum_{n=i}^{M} V_i, i = 1, \ldots, M.$

It can be shown that for Rayleigh fading $V_i$ are in fact i.i.d. random variables and have an exponential distribution with mean $\bar{g}$. Similarly, $W_i$ are also i.i.d. and have an exponential distribution with mean power gain $\bar{h}$. We can show that the probability distribution functions (pdfs) for $h_{[i]}$ and $g_{[i]}$ are $$f_{h_{[i]}}(x) = \frac{N!}{\bar{h}(i-1)!} \sum_{j=i}^{N} \frac{e^{-jx/\bar{h}}}{\prod_{l=i, l \neq j}^{N}(l-j)}, \quad (19)$$

$$f_{g_{[i]}}(x) = \frac{M!}{\bar{g}(i-1)!} \sum_{j=i}^{M} \frac{e^{-jx/\bar{g}}}{\prod_{l=i, l \neq j}^{M}(l-j)}, x \geq 0.$$

It can then be shown that $p(M, P_S)$ is given by $$p(M, P_S) = e^{-\gamma M/\bar{h}} \frac{N!}{M!} \sum_{j=M+1}^{N} \frac{1 - e^{-(j-M)\gamma/\bar{h}}}{(j-M) \prod_{l=M+1, l \neq j}(l-j)}. \quad (20)$$

The pdf of $g_{sum}$, for $x \geq 0$, is given by $$f_{g_{sum}}(x) = \frac{N!}{\bar{g}K(M)K(M)!} \sum_{j=K(M)+1}^{N} \left(1 - \frac{j}{K(M)}\right)^{-K(M)} e^{-\frac{jx}{K(M)\bar{g}}}.$$

Optimal Transmission Strategy

Again, note that $P_f(K(M), M)$ and $P_d(K(M), M)$ do not depend on $K(M')$ for $M' \neq M$. Thus, $$K^*(M) = \operatorname*{argmin}_{1 \leq K(M) \leq M} [T_f(K(M))P_f(K(M), M) + T_d P_d(K(M), M)]. \quad (21)$$

When M>1 relay nodes decode the data, the relay nodes can beamform to transmit with zero outage. This is in contrast to the case when M=1 relay node decodes the data. Here, data are transmitted with probability $(1-\delta)$. The optimal outage strategy has a structure if, for $M \geq 2$, $$cP_f(K^*(1),1) + T_d P_d(K^*(1),1) \geq c(1+K^*(M))P_f(K^*(M), M) + T_d P_d(K^*(M), M), \quad (22)$$

i.e., the optimal feedback and data power consumption conditioned on $M \geq 2$ is greater than or equal to that conditioned on M=1.

Thus, under this condition, the destination prefers data transmission with no outage. The following lemma 3 about the optimal transmission scheme's outage probability strategy follows.

Lemma 3: The optimal outage strategy has the following structure. For some $0 < M^* < N$, $$p_{out}^*(M) = 1, M < M^*, 0 \leq p_{out}^*(M^*) \leq 1, p_{out}^*(M) = 0, M > M^*. \quad (23)$$

Moreover, $$p_{out}(M^*)p(M^*, P_S) + \sum_{M=1}^{M^*-1} p(M, P_S) = P_{out}.$$

The proof is given in Appendix B.

Optimal Transmission Strategy

Figure 3:
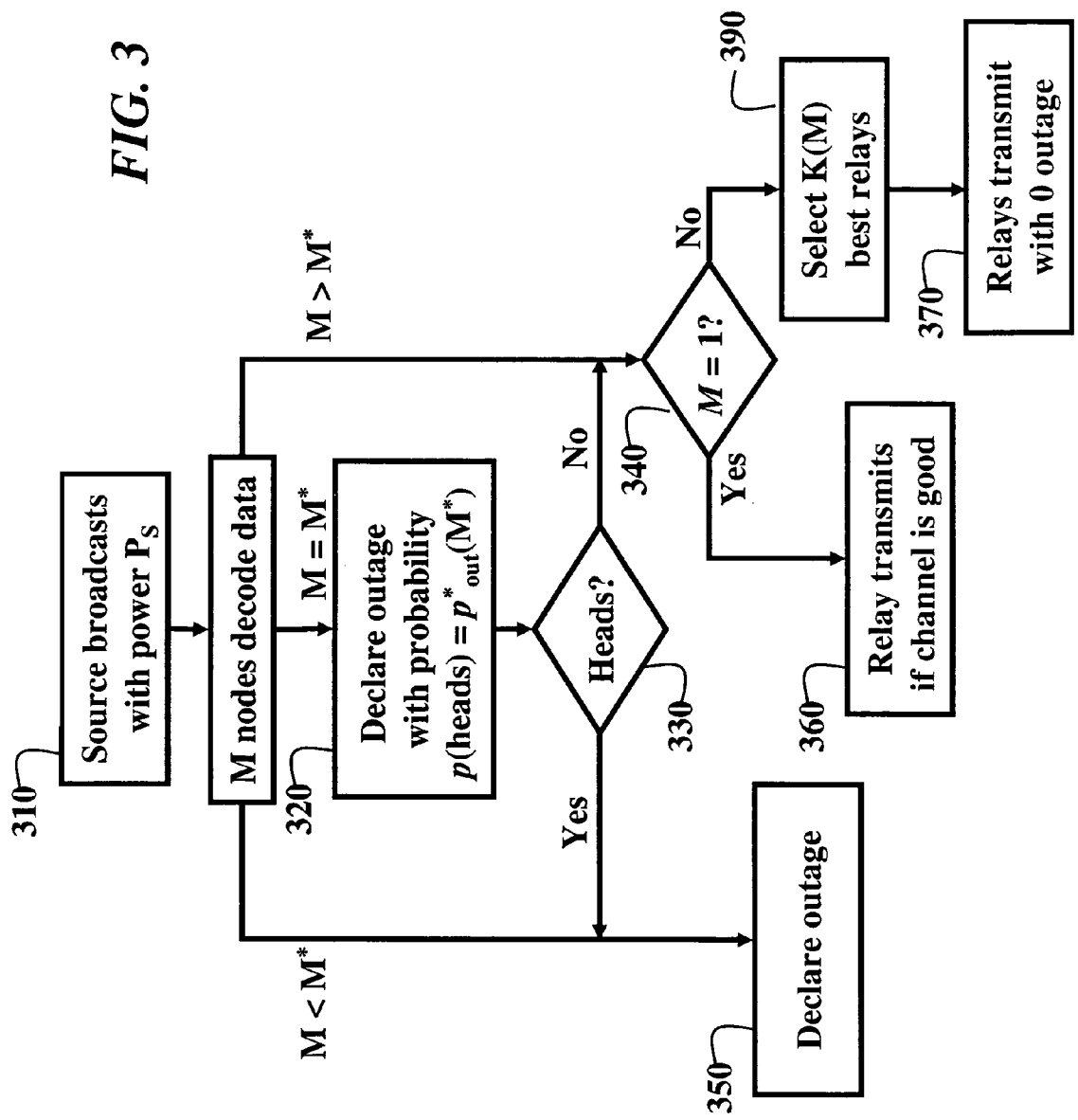
FIG. 3 is a flow diagram of an optimal relay selection strategy.

FIG. 3 shows the optimal transmission strategy. The source transmits 310 the data with power $P_S$. If the number of relays that decode the data successfully, M, is less than the threshold, M*, then the destination declares outage 350.

If M=M*, then the destination declares 320 outage with a probability $p^*_{out}(M^*)$. Else, the destination declares no outage. An example of a mechanism to implement this is to toss 330 a coin, in which the probability of heads equals $p^*_{out}(M^*)$. If the coin shows heads, then outage is declared 350.

If M>M*, the destination selects K*(M) relays and does not declares outage 350, unless the condition 340 M=1 is met, in which case, the destination allows the relay to transmit 360 only if its relay gain is above a threshold.

When the destination allows the selected relay(s) to transmit 390, the destination feedbacks the CSI to these relays, which then transmit 370 data packets with sufficient power to the destination.

The following lemma about convexity gives a sufficient condition that allows an efficient bisection search to be used to determine K*(M) for each M.

Lemma 4: For M≧3, if for all v=2, ..., M−1, $$\mathbb{E}\left(3\left(\frac{1}{g_{[v+1]}} - \frac{1}{g_{[v]}}\right) - \left(\frac{1}{g_{[v+1]}} - \frac{1}{g_{[v-1]}}\right)\right) \geq 0, \quad (24)$$

then there exists a convex function $z: \mathfrak{R} \mapsto \mathfrak{R}$ such that $$z(v) = T_f(v)P_f(v, M) + T_d P_d(v, M),$$

for all integers v from 1 to M.

Proof: The proof is given in Appendix C.

Results

We first describe the homogeneous case. This case provides considerable insight into the embodiments of the invention. The non-homogeneous case follows thereafter.

Homogeneous Case

We describe results for a cooperative relay network with ten relays and i.i.d. channel power gains. The data rate, r, is 2 bits/symbol. Assuming that 8 bits are required to feedback each channel gain and phase, we have c=4. Also, we take $T_d$ equal to 100 symbol times and the probability of an outage $P_{out}=0.01$. When one relay decodes the data broadcast by the source, the relay does not transmit with probability δ=0.005 due to bad channel state. All of the energy values are normalized with respect to $N_0 B$.

For the sake of this description, we assume that the power $P_t$ for transmitting the data is such that the power equals the power needed for transmitting from a relay to the destination at the rate r and with outage probability of 0.1, which is larger than $P_{out}$. This is justifiable because transmit diversity enables us to use a relay only when its channel to the destination is good. If the training data received at the destination have low power, then the channel is bad, and hence, the relays are not selected for data packet transmission.

Figure 4:
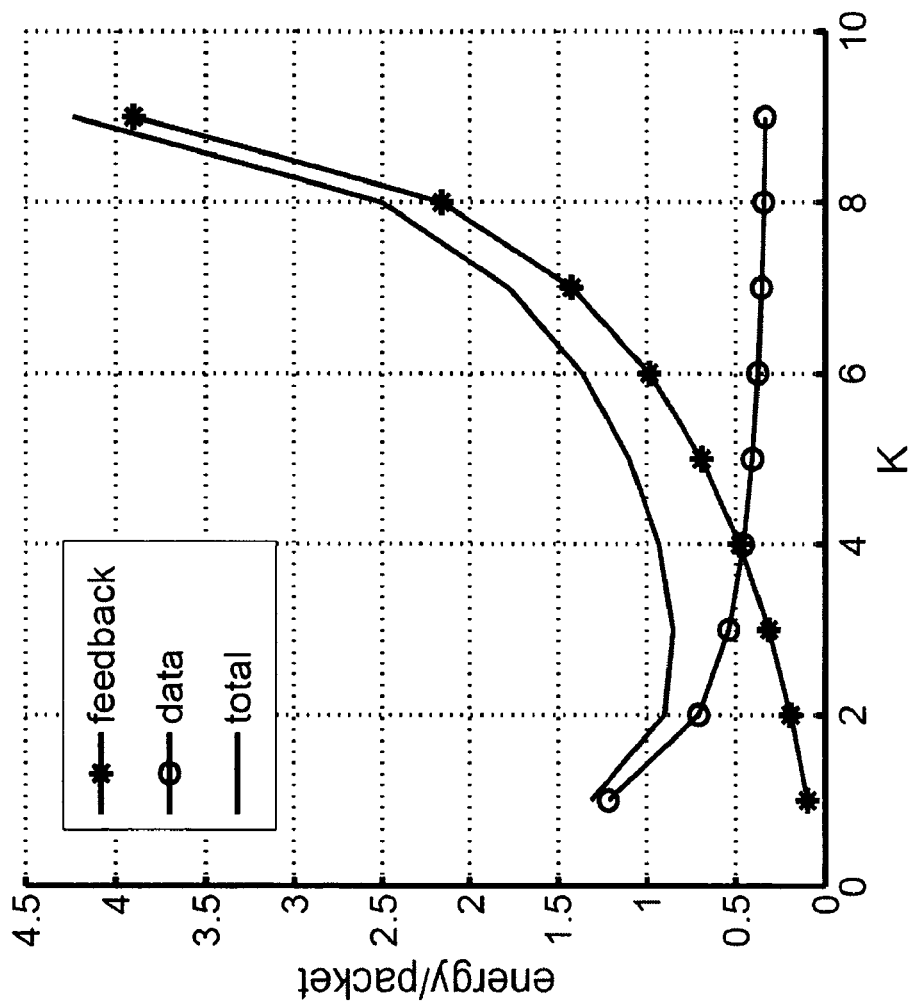
FIG. 4 is a graph comparing energy variation per packet as a function of feedback according to an embodiment of the invention.

FIG. 4 shows the variation with K(M) of the energy for feedback of CSI, $T_f(K(M))P_f(K(M), M)$, and energy for data transmission from the relays to the destination, $T_d P_d(K(M), M)$. We set M=10. Hence, K is the number of relays selected by the destination when ten relays decode the training data from the source.

We see that as K increases, the power consumption for CSI feedback increases because the destination has to feedback to more relays with worse channels. The power consumption for data transmission decreases with an increase in K because more relays can beamform to forward the data to the destination. It can be seen that the total feedback and data power consumption as a function of K can be fitted to a convex function.

Figure 5:
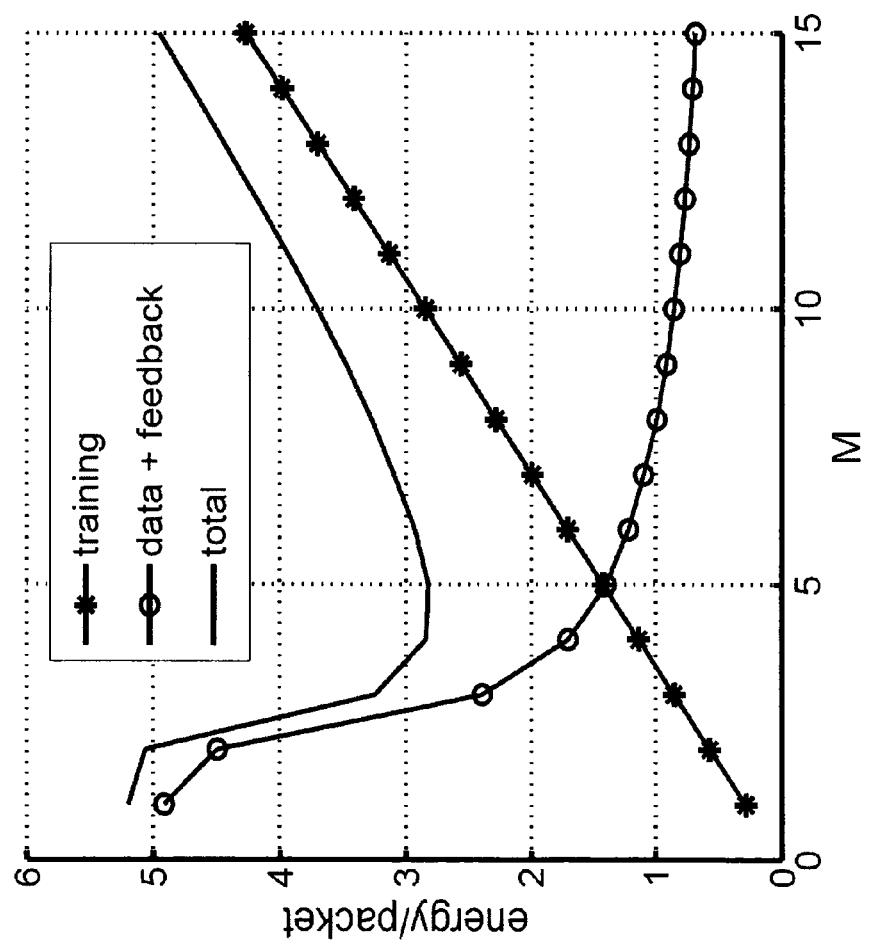
FIG. 5 is a graph of energy consumption for cooperative beamforming and feedback according to an embodiment of the invention.

FIG. 5 shows the variation of the energy for training and for cooperative beamforming and feedback of CSI for an optimal relay selection rule as a function of M. We see that when a larger the number of relays decode the training data, the the power consumption for feedback and data transmission for beamforming is less. However, this also increases the energy overhead spent in transmission of training data from the relays to the destination. We see that M=4 corresponds to the minimum total average energy consumption for training, feedback of CSI, and data packet transmission.

Figure 6:
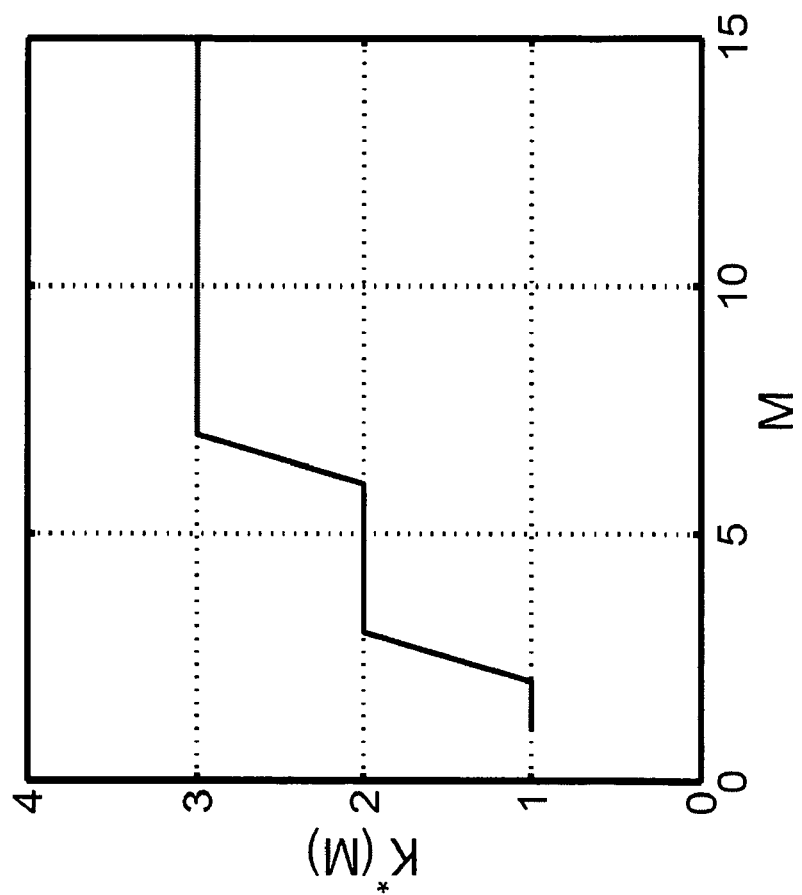
FIG. 6 is a graph showing an optimal relay selection rule as a function of the number of relays according to an embodiment of the invention.

FIG. 6 shows the optimal relay selection rule K*(M) as a function of M. We see that even for M as large as 15, K*(M) is less than or equal to 3. Hence, only a small subset f of the relays is active at any given time. However, the actual subset of relays used for data transmission changes dynamically depending on the changing channel state.

Figure 7:
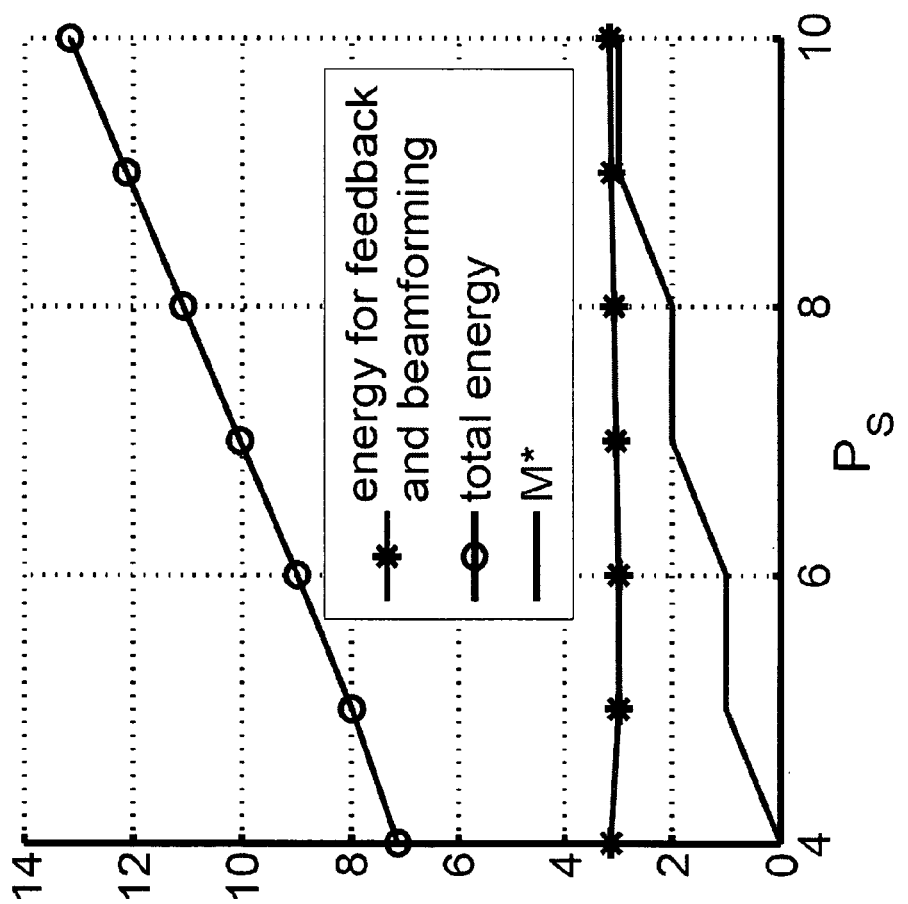
FIG. 7 is a graph of source broadcast power, total energy consumption and the energy consumption for training, feedback of CSI, and beamforming, according to an embodiment of the invention.

FIG. 7 shows variations of the total energy consumption and the energy consumption for training, feedback of CSI, and beamforming as a function of the source broadcast power, $P_S$. As $P_S$ increases, the probability of more relays being able to decode the training data from the source increases. Hence, M*, also shown in FIG. 7, increases, leading to a decrease in the energy consumption for the feedback of CSI to the relays and data packet transmission from the selected relays to the destination. This is offset by the additional energy consumed in training as M increases, as we saw in FIG. 5.

The almost flat curve for energy consumption in the relays and the destination suggests that these two competing effects almost cancel each other. Hence, the optimal strategy is to broadcast with a minimum possible power $P_S$ such that it is possible to forward the data from the relays to the destination with outage probability less than or equal to $P_{out}$, i.e., $p(0, P_S) + p(1, P_S) = P_{out}$.

Figure 8:
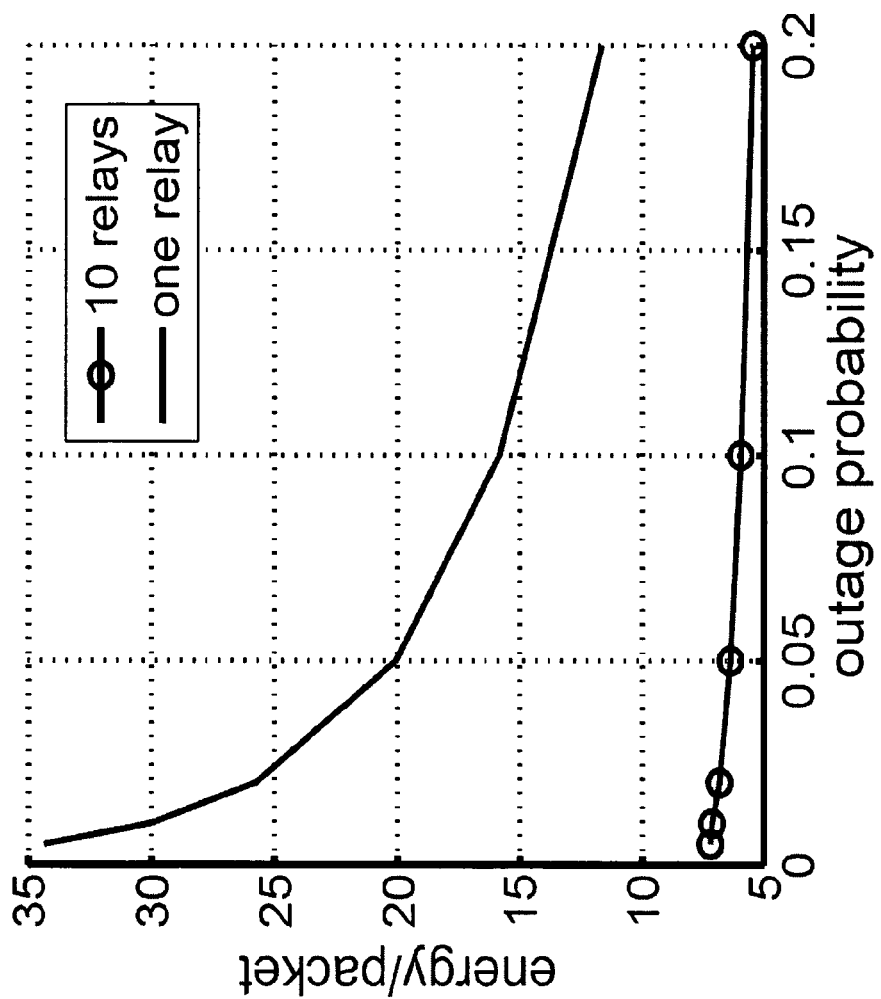
FIG. 8 is a graph comparing energy consumption, as a function of the outage probability, in a relay network with ten relays to that in a relay network with one relay according to an embodiment of the invention.

FIG. 8 compares the energy consumption as a function of the outage probability in a relay network with ten relays to that in a relay network with one relay. For the relay network with one relay, we consider two transmission schemes.

In a first scheme, the source transmits data packets to the relay after obtaining the CSI on the channel to the relay. In the second scheme, data are broadcast by the source to the relay without the knowledge of CSI. In both the schemes, the relay trains to obtain the CSI on the channel to the destination that the relay uses to forward the data with sufficient power to the destination. We can see that when the outage probability is decreased from 0.2 to 0.005, the energy consumption per data packet for the cooperative relay network with ten relays increases only by 32%. For the first transmission scheme for a network with one relay, the corresponding increase in the energy consumption per packet is 200%.

For the second transmission scheme for a network with one relay, the energy consumption per packet increases by over 35 times for the same reduction in outage probability from 0.2 to 0.005. Also, the energy consumption values are much larger (5 to 100 times) than that for the cooperative relay network with ten nodes. This indicates the diversity gains of the cooperative communication method according to the invention.

Figure 9:
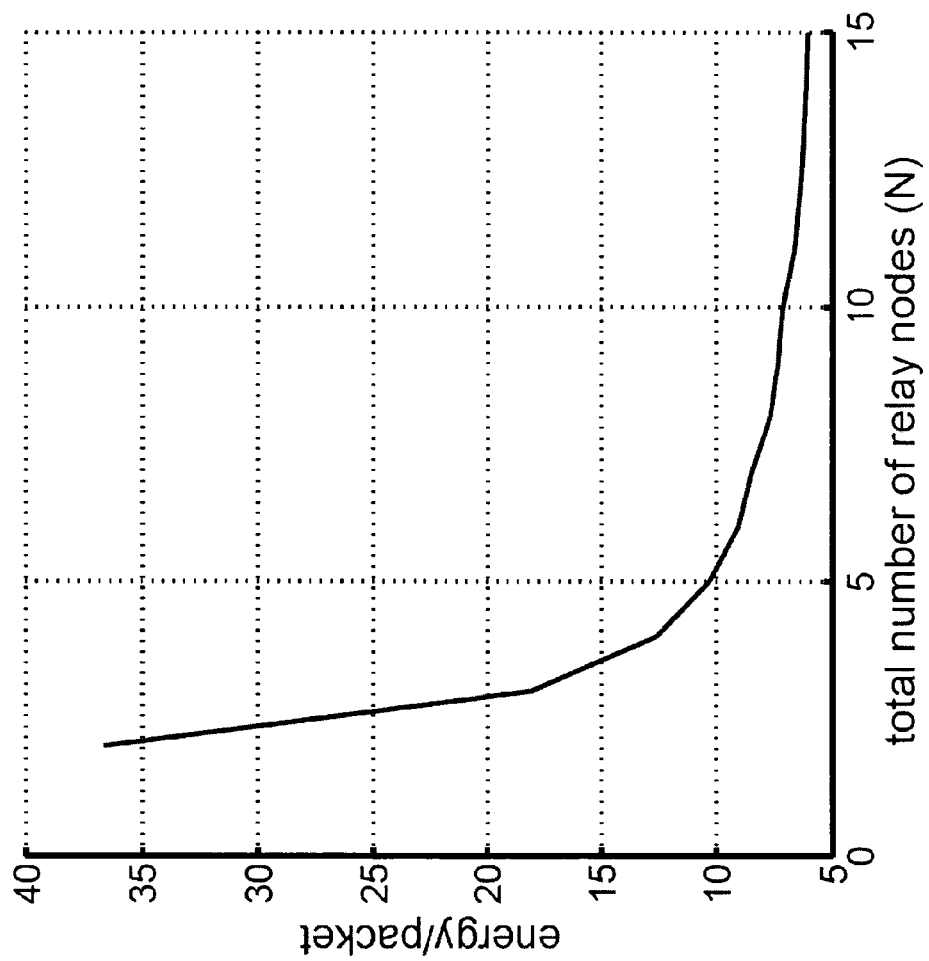
FIG. 9 is a graph of the total energy consumption for an optimal transmission scheme as a function of the total number of available relays.

In FIG. 9, the total energy consumption for an optimal transmission scheme is plotted as a function of the total number of available relays N. This plot shows that it is helpful to have a large number of available relays. However, the gains diminish as N increases. Also, as described above, only a small subset of the relays are actively used for data transmission at any given time.

IID Case

In order to optimize the transmission scheme, the optimal outage probabilities $p^*_{out}(M)$, broadcast power $P^*_S$, and relay selection rule $K^*(M)$ need to be determined. From the description above, we see that the search for $K^*(M)$ can be done for each M in an efficient manner. It is sufficient to search for $P_S$ that satisfies $p(0, P_S)+p(1-P_S)\delta=P_{out}$. Note that the probabilities $p(M, P_S)$ can be determined using the closed form expression in Equation (20).

Also, from lemma 1, the outage probability vector, $p^*_{out}$, which has a simple threshold structure, then follows easily.

Non-Homogeneous Case

We now consider the general case in which the mean channel power gains from the source to the relays, $h_1, \ldots, h_N$, and from the relays to the destination, $g_1, \ldots, g_N$, are not identical. As described above, this occurs due to different pathloss and log normal shadowing for the different relays. Moreover, the log normal shadowing for different links may be correlated. In general, these have the form $\bar{h}_i=10^{0.1X_i}$ and $\bar{g}_i=10^{0.1Y_i}$, where $X_i$ and $Y_i$ are Gaussian random variables with means $\mu_{X_i}$ and $\mu_{Y_i}$, and standard deviations $\sigma_{X_i}$ and $\sigma_{Y_i}$. Moreover, $X_i$ and $Y_i$ are correlated, with correlation coefficient $\rho$.

The general case in which the shadowing on all of the relay links are correlated can also be analyzed from the results given herein. Varying the correlation coefficient $\rho$ provides an excellent mechanism to study the impact of the differences in link gains between a relay and the source and the relay and the destination.

Shadow fading varies at a much slower rate of variation than Rayleigh fading. Thus, the averages over Rayleigh fading states are computed given the shadow fading means. For each instantiation of shadow fading values, an optimal transmission scheme is evaluated, which involves determining, using the analytical results of previous sections, the optimal broadcast power, the optimal relay selection rule, and the optimal outage rule. Then, the fading-averaged energy consumed is determined.

Figure 10:
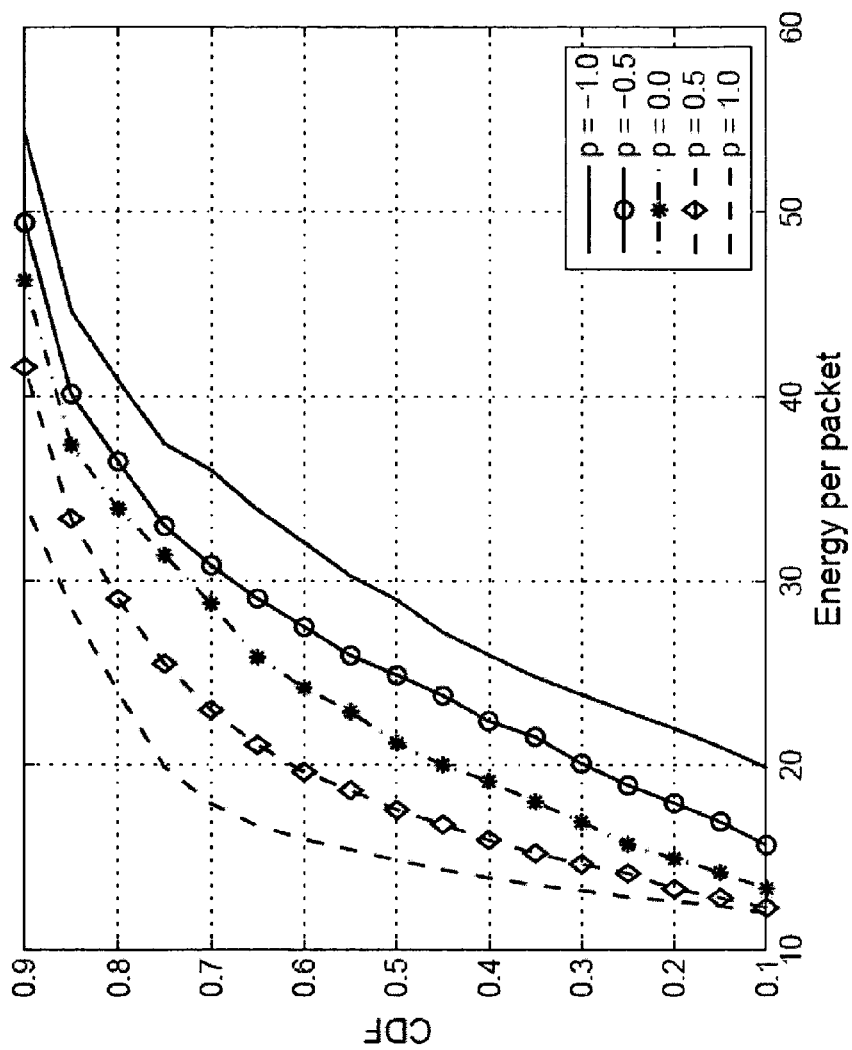
FIG. 10 is a graph of the cumulative distribution functions of energy consumption for non-homogeneous channel power gains with shadowing according to an embodiment of the invention.

FIG. 10 plots the cumulative distribution function (CDF) of the fading-averaged energy consumed for N=3 relays for different correlation coefficients, $\rho$. Plotting the CDF is very instructive because the CDF provides information about the entire energy distribution. For all the relays, the shadowing parameters were set as follows: $\mu_{X_i}=\mu_{Y_i}=0$ and $\sigma_{X_i}=\sigma_{Y_i}=6$. As the correlation coefficient increases from $-1.0$ (perfect anti-correlation) to 1.0 (perfect correlation), the energy consumed decreases, and the CDF shifts to the left.

Figure 11:
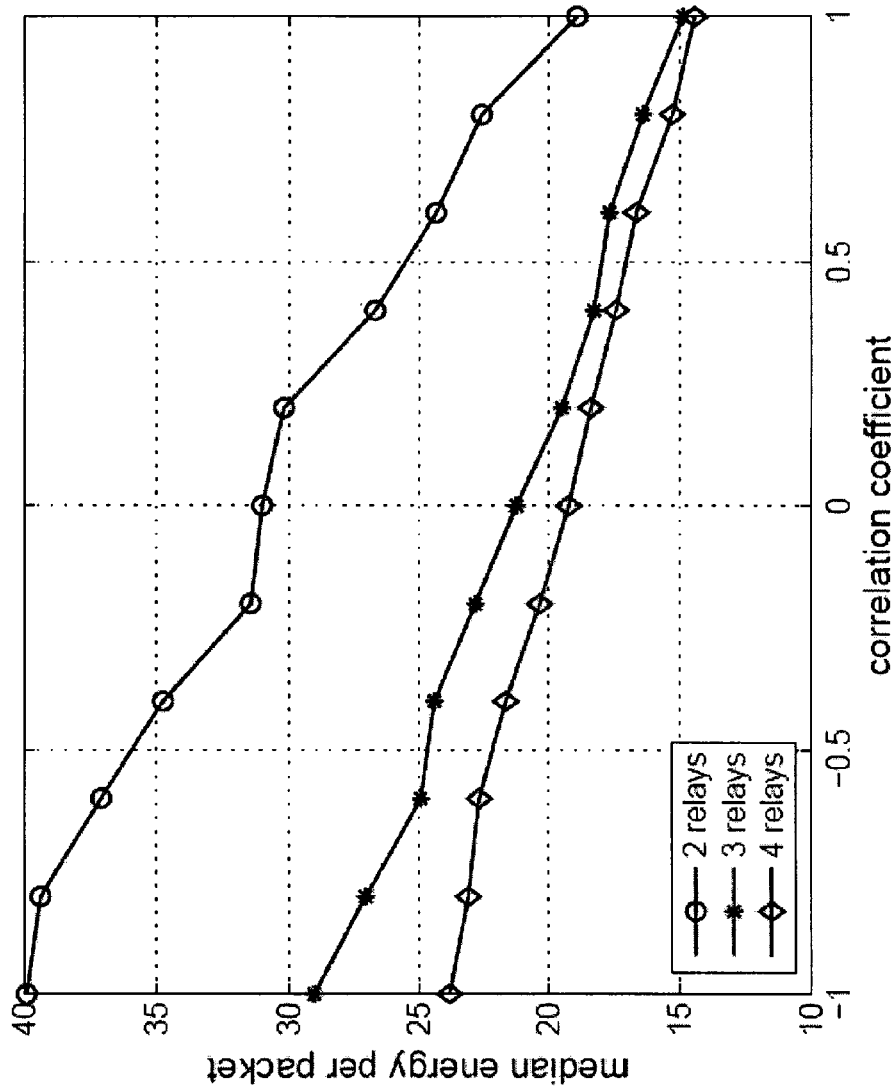
FIG. 11 is a graph of the median energy consumption for non-homogeneous channel power gains with shadowing according to an embodiment of the invention.

The effect of the number of relays on energy consumed is shown in FIG. 11, which plots the median energy as a function of $\rho$ for N=2, 3, and 4 relays. As was observed for the homogeneous, the energy consumed decreases as the number of relays increases, due to the greater diversity in the cooperative relay network.

EFFECT OF THE INVENTION

The invention can be used for a relay network where a source node broadcasts data packets with a transmit power to relay nodes, some or all of which then decode and cooperatively forward their received data to the destination coherently.

The system we consider is designed to satisfy a maximum outage probability. The system explicitly considers the energy and time overhead due to training, which is needed to acquire the relevant channel state information (CSI), and due to feedback, which is needed to enable cooperation among relays.

The invention describes a protocol that allows for data transmission from the source to the destination using cooperative relays as an intermediate hop between the source and destination.

Specifically, the relay nodes linearly weight their transmit signals so that the signals sum up coherently at the destination node in a way that minimizes total power consumption.

In a general case, the channel power gain over each link is independent with a different mean. The invention provides expressions for the average total power consumption to transmit data packets from the source to the destination using multiple relays, and determines the optimal relay cooperation rule to minimize the power consumption.

The invention shows that the CSI overhead can be a significant factor in a cooperative communications scheme. Accounting for the CSI overhead leads to a novel concept of a relay selection rule that determines the instantaneous subset of relays that should cooperate and forward data.

The invention describes simplified relay selection rules that select the relays based on the number of relays that decode the data broadcast by the source. The single best relay selection rule is a subset of this general relay selection rule described here.

The invention describes outage criteria that declare outages based on the number of relays that decode the data broadcast by the source.

The invention can be applied to cooperative relays with fading channels. Using virtual branch analysis, the total power consumption for such a system can be analyzed with explicit modeling of energy overhead for cooperation and for a given maximum system outage probability.

The analysis is done for the general case where the channel power gain on each link has a different mean. The invention provides an optimal relay selection rule for the most general case where all the channel gains can have different means.

An outage strategy can have a simple structure. The invention provides a solution for the special case where all the channel power gains are i.i.d.

Even though overhead is incurred to acquire the CSI, this cooperative communication scheme gives significant savings in energy. Also, the energy consumption increases slowly as the outage probability decreases.

Moreover, the results demonstrate that only a few relays should actively participate in data transmission at any given time. Thus, the system corresponding to the optimal transmission scheme is relatively simple.

The methods and analysis framework provided by the invention are general. Using these, it becomes possible to analyze many different classes of transmission schemes.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

Appendix A

Proof of Lemma 1

Proof: Let $c_{M_i}=T_f(K^*(M_i))P_f(K^*(M_i),M_i)+T_dP_d(K^*(M_i), M_i)$ and $$b = P_{out} - p(\theta, P_S) - \sum_{i=1}^{N} \delta_p(\{i\}, P_S)(1 - p_{out}(\{i\})).$$

Note that given $P_f(K^*(M_i),M_i)$ and $P_d(K^*(M_i),M_i)$, for all sets $M_i$, optimizing over $p_{out}(M_i)$ is equivalent to the solving following linear programming problem, with variables $p_{out}(M_i)$ (see equations (1) and (2)).

minimize
$$\sum_{i=1}^{2^N} p(M_i, P_S)((1-p_{out}(M_i))c_{M_i}$$

subject to
$$\sum_{i=1}^{2^N} p(M_i, P_S)p_{out}(M_i) \le b$$

$$0 \le p_{out}(M_i) \le 1, \forall i=1,\ldots,2^N$$

where by assumption $c_{M_i} \ge c_{M_j}$ for all $i \le j$. Consider an outage scheme $p_{out}$ for $$p_{out}(M_i)=\epsilon_i \text{ and } p_{out}(M_j)=\epsilon_j, 0 \le \epsilon_i < 1, 0 < \epsilon_j \le 1, \quad (25)$$

for some $l < j$. It is easy to see that if we take $p_{out}^1$ such that for $k \ne l, j$, $p_{out}^1(M_k)=p_{out}(M_k)$ and $$p_{out}^1(M_l) = \min\left(1, \epsilon_l + \frac{\epsilon_j p(M_j, P_S)}{p(M_l, P_S)}\right),$$

$$p_{out}^1(M_j) = \epsilon_j - \frac{\epsilon_l - p_{out}^1(M_l)}{p_{out}(M_l)},$$

then
$$\sum_{i=1}^{2^N} p(M_i, P_S)((1-p_{out}^1(M_i))c_{M_i} < \sum_{i=1}^{2^N} p(M_i, P_S)((1-p_{out}(M_i))c_{M_i}.$$

$N\, p(M_i, P_S)((1-p_{out}(M_i))c_{M_i}$. Hence, and $p_{out}$, for which the condition in equation (25) holds for some $i < j$, cannot be optimal. The result then follows.

Appendix B

Proof of Lemma 2

Proof: We will show that for $L \ge M > 1$
$$T_f(K^*(M))P_f(K^*(M),M)+T_dP_d(K^*(M),M) \ge$$
$$T_f(K^*(L))P_f(K^*(L),L)+T_dP_d(K^*(L),L).$$

Combining this with (22), the result follows from Lemma 3.1.

Now consider $L>M$. Then $K^*(M)$ is given by equation (21). Let $\hat{K}$ be a relay selection rule such that $\hat{K}(M)=K^*(M)$ and also $\hat{K}(L)=K^*(M)$. Define $$\mathbb{E}_M \frac{1}{g_{[i]}}$$

as the mean of $$\frac{1}{g_{[i]}},$$

when $g_{[i]}$ is the ith ordered channel gain of M i.i.d. channel gains. Then $$\mathbb{E}_M \frac{1}{g_{[i]}} \ge \mathbb{E}_L \frac{1}{g_{[i]}} \text{ and } \mathbb{E}_M \frac{1}{\sum_{i=1}^K g_{[i]}} \ge \mathbb{E}_L \frac{1}{\sum_{i=1}^K g_{[i]}}$$

for $K \le L, L \ge M$. Then we have $$T_f(K^*(M))P_f(K(M),M)+T_dP_d(K(M),M) \overset{(a)}{=}$$
$$T_f(\hat{K}(M))P_f(\hat{K}(M),M)+T_dP_d(\hat{K}(M),M) \overset{(b)}{\ge}$$
$$T_f(\hat{K}(L))P_f(\hat{K}(L),L)+T_dP_d(\hat{K}(L),L) \overset{(c)}{\ge}$$
$$T_f(K^*(L))P_f(K^*(L),L)+T_dP_d(K^*(L),L).$$

Step (a) is by assumption. Step (b) follows from equations (17) and (18), and the discussion above. Step (c) follows because $K^*$ is an optimal relay selection rule. This concludes the proof.

Appendix C

Proof of Lemma 3

Proof: It is enough to show that $f_M(v+1)-f_M(v) \ge f_M(v)-f_M(v-1)$, for all $v \in \{2,\ldots,M-1\}$. The result then follows—one possible choice for g is a piecewise linear function with the values at $v \in \{1,\ldots,M\}$ determined by $f_M$. Using equations (17),(18), we have $$f_M(v+1)+f_M(v-1)-2f_M(v) =$$

$$A\mathbb{E}\left[\left(\frac{1}{g_{[v+1]}}+\sum_{i=1}^{v+1}\frac{1}{g_{[i]}}\right)+\left(\frac{1}{g_{[v-1]}}+\sum_{i=1}^{v-1}\frac{1}{g_{[i]}}\right)- 2\left(\frac{1}{g_{[v]}}+\sum_{i=1}^{v}\frac{1}{g_{[i]}}\right)\frac{1}{\sum_{i=1}^{v+1}g_{[i]}}+\frac{1}{\sum_{i=1}^{v-1}g_{[i]}}-\frac{2}{\sum_{i=1}^{v}g_{[i]}}\right]$$

which simplifies to $$f_M(v+1)+f_M(v-1)-2f_M(v) =$$

$$A\mathbb{E}\left[\left(\frac{2}{g_{[v+1]}}+\frac{1}{g_{[v-1]}}-\frac{3}{g_{[v]}}\right)\left(\frac{1}{\sum_{i=1}^{v-1}g_{[i]}}-\frac{1}{\sum_{i=1}^{v}g_{[i]}}\right)- \left(\frac{1}{\sum_{i=1}^{v}g_{[i]}}-\frac{1}{\sum_{i=1}^{v+1}g_{[i]}}\right)\right] \ge 0.$$

where $A=N_0B(2^r-1)$ and $g_{[i]}$ is the ith largest channel gain of M i.i.d. channel gains.

We claim:

1. A method for communicating information in a cooperative relay network of wireless nodes, the wireless nodes including a source, a set of relays, and a destination, comprising the steps of:
   estimating channel state information for each channel between a particular relay of the set of relays and the destination, in which channels of the cooperative relay network are frequency non-selective channels that undergo independent Rayleigh fading;
   selecting a subset of the relays, based on the channel state information;
   feeding back the channel state information to the subset of relays;
   broadcasting data packets from the source to the subset of relays; and forwarding coherently the data packets from the subset of relays to the destination using beamforming based on the channel state information.

2. The method of claim 1, further comprising:
decoding the data packets at particular relays of the set of relays having a sufficiently high signal to noise ratio;
transmitting training data from the particular nodes to the destination node; and
estimating the channel state information from the training data.

3. The method of claim 2, in which the selecting is based on the number of particular relays that decode the data broadcast by source.

4. The method of claim 2, in which the signal to noise ratio is based on a Shannon capacity formulation.

5. The method of claim 1, in which the beamforming uses linearly weighted signals from the subset of relays to the destination.

6. The method of claim 1, in which the channels are reciprocal.

7. The method of claim 1, in which the broadcasting is at a fixed power $P_S$, a fixed data rate r, and for $T_d$ symbol durations.

8. The method of claim 1, in which the destination declares an outage, and no relays are selected.

9. The method of claim 8, in which the estimating depends on instantaneous channel power gains, and the outage is declared independent of the instantaneous channel gains.

10. The method of claim 8 in which the outage is declared based on data packets broadcast to the set of relays by the source, and the particular relays that decode the data packets.

11. The method of claim 10, in which only one relay decodes the data packets, and selecting the one relay only if the corresponding signal to noise ratio exceeds a predetermined threshold.

12. The method of claim 8, in which the declaring is based on virtual branch analysis techniques.

13. The method of claim 1, in which the estimating depends on instantaneous channel power gains.

14. The method of claim 1, in which the channel information fed back to all of the relays in the subset is a sum of channel power gains, and the channel information fed back to each relay is a corresponding channel power gain and a corresponding channel phase of each corresponding relay of the subset.

15. The method of claim 1, in which a longest possible period for feeding back is less than a coherence time of the corresponding channel.

16. The method of claim 1, in which the selecting is based on virtual branch analysis techniques.

17. The method of claim 1, further comprising:
declaring an outage if a number of selected relays in the subset is less than a threshold, declaring the outage with a computable probability if the number is equal to the threshold, else declaring no outage.

18. The method of claim 1, further comprising:
transmitting training data from the destination node to the subset of relays; and
determining channel gains in the subset of relays from the training data.

19. The method of claim 18 in which the destination node transmits to the subset of relays a threshold for the channel gain that the subset of relays must exceed in order to forward the data packets.

20. The method of claim 1, in which the source broadcasts the data packets before the estimating; and further comprising:
decoding the data packets in the particular relays;
storing the decoded data packets in the selected relays in which the source sends out training data before the forwarding.

21. The method of claim 1, in which the intermediate relay nodes in a multi-hop relay network are 'intermediate' destination nodes, further comprising:
transmitting from source to relays to intermediate destination nodes as per the method of claim 1; and
forwarding the data by the intermediate destination nodes to the final destination node or other intermediate destination nodes.

22. The method of claim 1, in which the estimating is performed on the data packets.

23. The method of claim 1, in which the estimating is performed on training data.

24. The method of claim 1, in which the estimating is performed by the particular relay nodes.

25. The method of claim 1, in which the estimating is performed by the destination node.

26. The method of claim 1, in which one of the selected relays is an intermediate relay acting as a source for a next relay in a multi-hop cooperative relay network.

27. The method of claim 1, in which the estimating, selecting, and feeding back is dynamic as the channel state information changes over time.

28. The method of claim 27, further comprising:
adjusting power levels of the subset of relays dynamically to minimize a total energy consumption in the cooperative relay network.

29. The method of claim 1, in which the feeding back is explicit.

30. The method of claim 1, in which the feeding back is implicit.

31. The method of claim 1, in which the channels are homogeneous Raleigh fading channels.

32. A method for communicating information in a cooperative relay network of wireless nodes, the wireless nodes including a source, a set of relays, and a destination, comprising the steps of:
broadcasting data packets, from a source to a set of relays of a cooperative relay network;
decoding the data packets at particular relays of the set having a sufficiently high signal to noise ratio;
transmitting training data from the particular nodes to a destination node of the cooperative relay network;
estimating the channel state information for each channel between the destination and each particular relay based on the training data, in which channels of the cooperative relay network are frequency non-selective channels that undergo independent Rayleigh fading;
selecting a subset of the relays, based on the channel state information;
feeding back the channel state information to the subset of relays; and
forwarding coherently the data packets to the destination using beamforming based on the channel state information to minimize a total energy consumption in the cooperative relay network.

33. A method for communicating information in a cooperative relay network of wireless nodes, the wireless nodes including a source, a set of relays, and a destination, comprising the steps of:
decoding data broadcast by the source to the set of relays by particular relays having a sufficiently high signal to noise ratio;
transmitting training data from the particular nodes to a destination;

estimating channel state information for each channel between the destination and each particular relay based in the training data, in which channels of the cooperative relay network are frequency non-selective channels that undergo independent Rayleigh fading; and selecting a subset of the relays, based on the channel state information, for forwarding the data packets from the selected subset of relays to the destination while minimizing a total power consumption in the cooperative relay network.

34. A cooperative relay network of wireless nodes, comprising:

a source node configured to broadcast data packets;

a set of relays configured to decode the data packets having a sufficiently high signal to noise ratio, and to transmit training data; and a destination node configured to estimate channel state information for each channel between the destination and each relay based on the training data, and to select a subset of the relays, based on the channel state information, and to feed back the channel state information to the subset of relays so that the subset of nodes forward coherently the data packets to the destination using beamforming based on the channel state information to minimize a total energy consumption in the cooperative relay network, in which channels of the cooperative relay network are frequency non-selective channels that undergo independent Rayleigh fading.

* * * * *